May 8, 1956 W. R. FISHER 2,744,424
DRILL GUIDE BUSHING
Filed Jan. 10, 1952
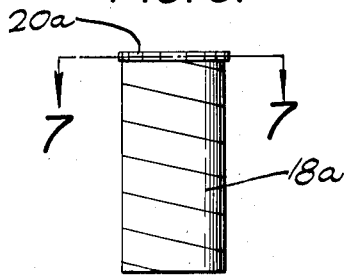
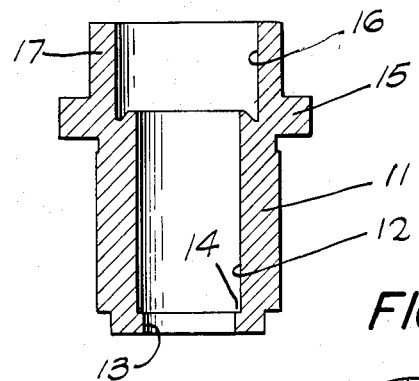
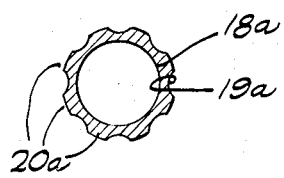
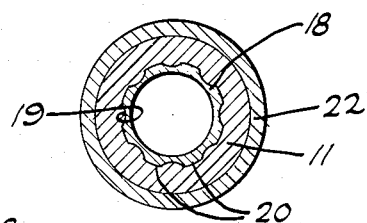
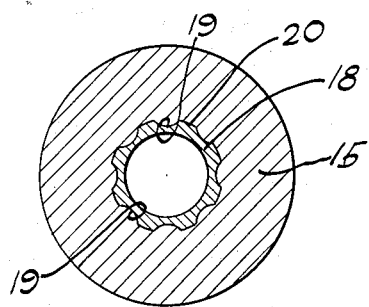
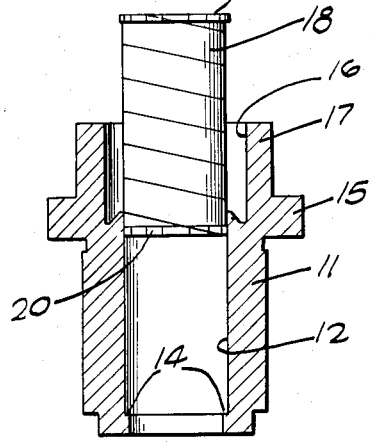
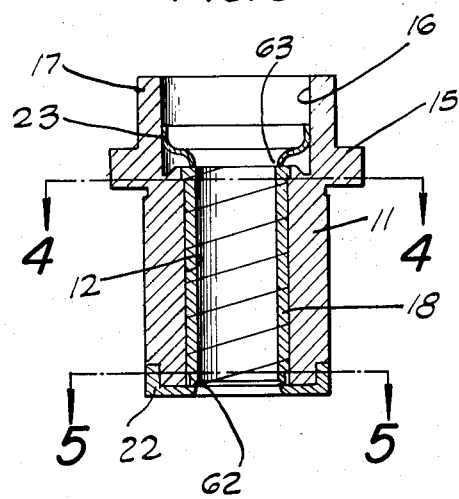
INVENTOR.
W. REUEN FISHER
BY
ATTORNEY.

United States Patent Office 2,744,424
Patented May 8, 1956

2,744,424
DRILL GUIDE BUSHING

W. Reuen Fisher, North Branch, Mich.

Application January 10, 1952, Serial No. 265,754

3 Claims. (Cl. 77—62)

My invention relates to a new and useful improvement in a drill guide bushing adapted for use as a guide for drills, taps, reamers and so forth when the same are used for working upon a work-piece.

It is an object of the present invention to provide a drill guide bushing of this class which will be simple in structure, economical of manufacture, durable, highly efficient in use and easily and quickly assembled.

Another object of the invention is to provide a bushing of this class having a retainer with a bore formed therethrough and having a coiled liner inserted in the bore in such a manner that contact of the rotating tool, such as a drill, reamer or the like, with the liner will have a tendency to expand the liner into close contact with the surface of the bore of the retainer, so that frictional engagement between these parts will resist any tendency of relative rotation.

Other objects will appear hereinafter.

It is recognized that various modifications and changes may be made in the detail of structure illustrated without departing from the invention and it is intended that the present disclosure shall be considered but the preferred embodiment.

Forming a part of this application are drawings in which:

Fig. 1 is a longitudinal central sectional view of the retainer,

Fig. 2 is a longitudinal central sectional view of the retainer showing the liner partially inserted therein, Fig. 3 is a longitudinal central sectional view of the retainer showing the liner in full inserted position, Fig. 4 is a sectional view taken on line 4—4 of Fig. 3, Fig. 5 is a sectional view taken on line 5—5 of Fig. 3, Fig. 6 is a side elevational view of a liner showing a slightly modified form, Fig. 7 is a sectional view taken on line 7—7 of Fig. 6.

The invention embodies a retainer and a liner, this retainer having a bore formed therethrough into which is inserted the liner and the liner having a bore formed therethrough of the proper inside diameter to accommodate rotating tools, such as drills, reamers and the like, of a specified diameter. This guide bushing may be used in connection with a liner bushing. When used with a liner bushing the liner bushing is fixedly fastened in a jig plate in which has been formed an opening for reception of the liner bushing. When used in this manner the retainer of the guide bushing is inserted in the liner bushing. Some operators, in some cases, prefer to avoid the use of the liner bushing. In these instances the jig plate is provided with the properly located openings into which the retainer of the guide bushing is inserted. This insertion generally is by press fit.

In the drawings of the present application I have shown a retainer 11 having a bore 12 formed therethrough communicating at one end with a smaller bore 13, so that a flange or shoulder 14 is formed inwardly from the lower end of the retainer 11. Formed on the retainer 11 adjacent its tube end is a peripheral flange 15 and extending upwardly from this flange 15 is a tubular head 17 having a bore 16 formed therein slightly larger than the bore 12. A liner 18 is formed as a coiled body. This coiled body is formed from flat resilient stock of a determined thickness. When the wire is wound it is wound with an outside diameter slightly larger than the bore 12 of the retainer. Experience has shown that, by forming the coil with an outside diameter of a size .005" larger than the bore in the retainer, a very satisfactory result may be effected. When the liner is formed the coils will be slightly spaced apart. As the liner is inserted into the bore of the retainer the liner is rotated so as to move the spiral windings into close relation and thus reduce the outside diameter of this liner. This permits the liner to enter the retainer as a snug fit. This also, since the thickness of the wire from which the coil is made is predetermined, determines the inside diameter of the liner. Formed on the opposite ends of the liner 18, shown in Fig. 2, are spaced apart grooves 19 to provide the serrations 20 on the periphery of the liner, so that the liner may be said to be serrated at its opposite ends. As this liner is inserted into the retainer and the serrations 20 are brought into engagement with the flange or shoulder 14 and the longitudinal movement of the liner is continued by pressing operation, these serrations will cut through the flange 14, so that they will assist in preventing relative rotation of the retainer and the liner. The serrations at the upper end are formed in a rolling operation, so that they project slightly beyond the closed periphery of the coil and also will cut into the upper end of the liner 11. After the parts have been assembled, as shown in Fig. 3, a cap 22 is mounted by a press fit on the lower end of the retainer 11, so as to overlie the liner, but not to a distance that the cap 22 would project into the space defined by the bore of the liner 18. Similarly a cap 23 is mounted in the head 17 so as to overlie the liner but leave the bore of the liner clear.

In high speed drilling a "bug" or a chip will frequently adhere or seal to the drill. This, of course, would be below and in proximity to the lower end of the guide bushing with the result that this bug or chip rotating with the drill would engage against the lowermost coil of the liner. Due to the fact that the winding of the coil is opposite to the direction of the rotation of the drill, a turning contact between the tool and the liner will have a tendency to expand the spring coil into engagement with the liner due to the unwinding strain. This will effect a surface contact of the coiled liner at its periphery, throughout its length, with the inner face of the bore of the retainer, with the result that this frictional engagement will resist a relative rotation between the liner and the retainer. This prevents the possibility of breaking off the end of the coil with which the bug or chip, rotating with the drill, may engage.

In Fig. 6 I have shown the coil liner 18a constructed as already described, excepting that the serrations appear at only one end, the grooves 19a being spaced by the portions 20a.

The metal from which the coil liner is made is formed from wear-resisting metal. It is formed from resilient steel, heat treated to harden the same. The retainer 11 may be made of soft metal so that the expense of completing the guide bushing is thus reduced considerably.

It is believed obvious that the outside diameter of the liner is controlled by the size of the bore 12 of the retainer. The inside diameter of the coil is, of course, controlled by the outside diameter and the thickness of the wire or band from which the coil is made.

If desired the coil 18 may be used with retainers 11 having a bore 12 of different diameter. Experience has shown that the variation in the diameter of the bore 12, which will snugly receive the coil, may vary as much as .020". Even though the windings of the coil are close together, when the coil is fabricated, as the torque is applied to the coil to reduce its outside diameter the windings will creep on each other. Consequently the same coil is thus used with retainers having different diameter of bores with the result that the same coil may be used as a guide for rotating tools of different outside diameters. This is so because if the bore of the retainer, which snugly receives the coil, is of a specified diameter and the coil is snugly received within the bore, the inside diameter of the coil is thus determined. This makes it possible to supply a smaller number of liners or cores to cover a certain range of tool diameters. The retainer, of course, is made from soft non-hardened material and, therefore, is comparatively cheap to manufacture. The user of this construction would be provided with a number of retainers each having a different diameter of bore formed therethrough. For each group of retainers within a certain range of bore diameter there would be provided a single core or coil. Consequently the user of the invention would not be required to stock a core or liner for each diameter of tool with which it was intended to use the guide bushing. This is so because the diameter of the bore of the retainer will determine the inside diameter of the liner or coil.

It will be noted that the opposite ends of the coil are chamfered inwardly of the bore. It will also be noted that there is a chamfer 62 on the member 22 and a chamfer 63 on the member 23. As these members 22 and 23 are forced into position the engagement of these inclined faces with each other will have a tendency to expand the coil outwardly into close relation with the inner surface of the bore 12.

It is believed obvious that the core or liner serves as a bearing or bushing for the rotating tool member which is projected therethrough. This construction could also be used as a bearing for any rotating part. For instance, an arbor or a shaft. Should the rotating part become worn so that it is of smaller diameter than its original outside diameter, the bearing may be easily and quickly removed and replaced with a proper size bearing. This could be accomplished by removing the coil from the retaining member and then inserting into the bore of the retaining member a coil of substantially the same outside diameter having an increased wall thickness to compensate for the wear which has taken place on the rotating part.

It is also believed obvious that if desired the retainer 11 may be eliminated and the bore 12 may be formed in the jig plate so that the jig plate itself becomes the retainer.

Experience has shown that when the retainer 11 is formed of a metal of high thermal conductivity, such as aluminum, zinc, copper or the like, heat generated on the liner is quickly dissipated. Experience has shown that where an over-size drill was used in one of the guide bushings the operation could continue until the drill was highly heated closely approaching a cherry red and the head 17 of the retainer remained cool enough to be touched with the bare hand. This is advantageous particularly in prolonging the life of the liner, whether used as a guide or a bearing, and also prolonging the life of the rotating element which is generating the heat.

What I claim is:

1. In a drill guide bushing of the class described adapted for use with a rigid retainer having a smooth bore formed therethrough of uniform diameter from end to end and through which a rotating body is adapted to be projected, a tubular liner for said bore comprising a spirally wound body of flexible, resilient, wear-resisting metal of uniform thickness from end to end, said body being spirally wound to an outside diameter uniform throughout its length and slightly larger than the bore through said retainer; the outside diameter of said spirally wound body being reducible, in response to force, to snugly engage in the bore of said retainer, said windings of said liner, when said liner is positioned in said bore, engaging at opposed edges to form a smooth bore through said liner, the coils of said liner, upon release of the reducing force, moving toward the original outside diameter for frictionally engaging at the periphery the surface of said bore for retaining said liner in fixed relation to said retainer.

2. The structure defined in claim 1 in which the windings of the liner are in a direction opposite to the direction of rotation of the rotating tool projected therethrough.

3. The structure defined in claim 2 in which there is a means on the spirally wound body inter-engaging with the retainer for additionally maintaining said spirally wound body and said retainer in fixed relative position.

References Cited in the file of this patent
UNITED STATES PATENTS

| | | |
|---|---|---|
| 479,039 | Van Benthuysen | July 19, 1892 |
| 1,454,682 | Layne | May 8, 1923 |
| 2,329,286 | Meyer | Sept. 14, 1943 |
| 2,427,994 | Merrill | Sept. 23, 1947 |